United States Patent
Galley et al.

(10) Patent No.: US 9,188,333 B2
(45) Date of Patent: Nov. 17, 2015

(54) DILUTE COMBUSTION

(75) Inventors: David Galley, Paris (FR); Paula Goncalves-Ferreira, Creteil (FR); Laurent Pierrot, Chalon-sur-Saone (FR)

(73) Assignees: SAINT-GOBAIN EMBALLAGE, Courbevoie (FR); SAINT-GOBAIN GLASS FRANCE, Courbevoie (FR)

( * ) Notice: Subject to any disclaimer, the term of this patent is extended or adjusted under 35 U.S.C. 154(b) by 600 days.

(21) Appl. No.: 12/663,152

(22) PCT Filed: Jun. 5, 2008

(86) PCT No.: PCT/FR2008/051007
§ 371 (c)(1),
(2), (4) Date: Apr. 8, 2010

(87) PCT Pub. No.: WO2008/152335
PCT Pub. Date: Dec. 18, 2008

(65) Prior Publication Data
US 2010/0199722 A1    Aug. 12, 2010

(30) Foreign Application Priority Data
Jun. 8, 2007 (FR) ..................... 07 55580

(51) Int. Cl.
*C03B 5/00* (2006.01)
*F23D 14/22* (2006.01)
*C03B 5/235* (2006.01)
*F23D 14/32* (2006.01)

(52) U.S. Cl.
CPC ............... *F23D 14/22* (2013.01); *C03B 5/235* (2013.01); *C03B 5/2353* (2013.01); *F23D 14/32* (2013.01); *Y02E 20/344* (2013.01)

(58) Field of Classification Search
CPC ....... F23D 14/06; F23D 14/22; F23D 21/005; F23D 14/32; C03B 5/2353; C03B 2207/36; C03B 2207/42; C03B 5/235; Y02E 20/344
USPC ........ 65/136.3, 135.9, 335; 432/175; 110/260
See application file for complete search history.

(56) References Cited

U.S. PATENT DOCUMENTS

| 4,945,841 | A  |  8/1990 | Nakamachi et al. |
| 4,988,285 | A  |  1/1991 | Delano |
| 6,331,107 | B1 | 12/2001 | Philippe |
| 6,422,041 | B1* | 7/2002 | Simpson et al. ............. 65/134.4 |
| 2003/0054301 | A1* | 3/2003 | Borders et al. .................... 431/8 |

FOREIGN PATENT DOCUMENTS

| EP | 0 343 746 | 11/1989 |
| EP | 0 413 309 |  2/1991 |

* cited by examiner

*Primary Examiner* — Richard Crispino
*Assistant Examiner* — Yana B Krinker
(74) *Attorney, Agent, or Firm* — Oblon, McClelland, Maier & Neustadt, L.L.P.

(57) ABSTRACT

The invention relates to a method of combustion in a furnace provided with a burner comprising an inlet for oxidizer comprising between 10% and 30% of oxygen and an inlet for fuel terminating in the furnace outside the oxidizer inlet and at a distance therefrom of between 0.3 and 4 times the equivalent diameter of the oxidizer inlet, said oxidizer entering the furnace at a speed of between 10 and 60 m/s. This method permits a significant reduction in nitrogen oxide emissions and is suitable for glass furnaces in particular.

19 Claims, 3 Drawing Sheets

DILUTE COMBUSTION

The present application in the U.S. National Stage Application of PCT/FR2008/51007, filed on Jun. 5, 2008 (WO 2008/152335), the text of which is incorporated herein by reference and claims priority to French Application No. 0755580 filed on Jun. 8, 2007, the text of which is incorporated herein by reference.

The invention relates to a dilute combustion method generating little nitrogen oxide and applicable to glass furnaces in particular.

A person skilled in the art generally denotes by "NOx" the nitrogen oxide emissions of the NO and/or $NO_2$ type resulting from the undesirable oxidation of nitrogen. A major source of nitrogen is the nitrogen present in the oxidizer, such as air or oxygen-enriched air.

Most combustion methods, particularly those used in glass furnaces, are faced with problems of undesirable NOx emission in the flue gases. NOx gases are harmful to humans and to the environment. In fact, on the one hand, $NO_2$ is an irritant gas and the cause of respiratory ailments. On the other, in contact with the atmosphere, NOx can gradually form acid rain. Finally, they generate photochemical pollution because in combination with volatile organic compounds and solar radiation, NOx causes the formation of ozone called tropospheric ozone, which, when its concentration increases at low altitude, becomes harmful to humans, especially in very hot periods.

This is why the standards in force on NOx emissions are becoming increasingly stringent. Due to the very existence of these standards, furnace manufacturers and operators such as those of glass furnaces are constantly concerned to minimize NOx emissions, preferably to a level lower than 800, or even lower than 600 mg per $Sm^3$ of flue gases.

Temperature is a parameter that strongly influences NOx formation. Above 1300° C., NOx emissions increase very significantly.

NOx can be reduced according to two principles called primary methods and secondary methods. Primary methods consist in preventing the formation of NOx, while secondary methods are aimed to destroy the NOx after its formation.

A secondary method for reducing NOx consists in using a reducing agent on the emitted gases to convert the NOx to nitrogen. The reducing agent may be ammonia, but this raises drawbacks such as the difficulty of storing and handling such a product. The presence of reducing gases in certain parts of the furnace, such as the checker chambers, can also cause accelerated corrosion of the refractories in these zones.

Considering the above limitations, primary methods are preferable. To limit the formation of NOx in the flame, it may be possible to reduce the excess combustion air. It is also possible to try to limit the temperature peaks by increasing the volume of the flame front to reduce the average temperature in the flame. Such a solution is described for example in U.S. Pat. No. 6,047,565 and WO9802386. The fuel and oxidizer are fed in succession, in such a way as to spread the fuel/oxidizer contact over time and/or to increase the contact volume in order to reduce the NOx emission.

EP413309 teaches that NOx can be reduced by the following joint measures:
 placing the oxidizer and fuel inlets at considerable distance from one another, more than four times the oxidizer inlet diameter;
 injecting the oxidizer at high speed, from 200 to 1070 feet per second (or between 60 m/s and 326 m/s) and preferably between 500 and 1070 feet per second (or between 152 m/s and 326 m/s).

The examples in this document were obtained with very-high-oxygen oxidizer (50% oxygen). The NOx is reduced by 17 to 43%. The figure shows the oxidizer and fuel inlets via metal tubes of the same diameter.

EP896189 claims to improve this technique by recommending:
 the use of an oxidizer that is richer in oxygen than air,
 the injection of the oxidizer and the fuel at speeds between mach 0.25 and 1. The speeds of sound in air and in methane at ambient temperature (T=25° C.) are 346 m/s and 450 m/s respectively. The value of 0.25 mach corresponds to a speed of 87 m/s for air and 112 m/s for $CH_4$ at ambient temperature. As the temperature rises, these speeds increase with the square root of temperature. This document also recommends a speed of over 100 m/s for the fuel and more than 75 m/s for the oxidizer.

NOx reduction is based on the principle of the dilution of the reaction partners in the laboratory flue gases, leading to flame temperatures that are lower and more uniform. Another concept is flameless combustion, which simply means that the flame is not visible to the naked eye.

The teaching of these documents is difficult to adapt to glass furnaces operating in air or moderately oxygen-enriched air, because these furnaces have oxidizer inlets with very large cross sections, possibly between 0.5 and 3 $m^2$ in particular. According to the prior art, the fuel injector is always located just below or inside (often at the bottom) the oxidizer inlet, just before entering the furnace laboratory. In particular, the characteristic configuration of a glass furnace burner is shown in FIG. 6. The large oxidizer inlet diameters derive in particular from the following reasons:
 large gas volumes (especially if the oxidizer is air) are required and a large diameter limits the pressure drop;
 a small diameter results in high gas speeds which can cause the flyoff of supernatant powder batch materials on the melt surface; in fact, supernatant powder batch materials are located on the surface of the glass, at least in the first upstream third of the furnace (with reference to the glass flow direction) and even in the upstream half of the furnace; these powders, entrained by the gases, then spread on the walls and the arch, or inside the flue gas recovery lines, instead of participating in the production of the glass; moreover, they often contain corrosive materials (alkaline oxide, boron derivative, etc.) which will react and damage the surfaces on which they are deposited; in the case of unit melter furnaces, the flue gas recovery lines are relatively narrow and powder flyoffs must be eliminated to avoid clogging these lines;
 these oxidizer inlets (generally air) are often made from a friable refractory (particularly in the case of checker chamber furnaces: cross-fired furnaces and end-fired furnaces) and subject to erosion in proportion to the gas flow rate. It is important that refractory particles do not pollute the glass melt;
 these air inlets often operate alternately, as air inlets and as fume collectors when the furnace is end-fired and equipped with checker chambers; an excessively small diameter hinders flue gas collection, and requires the use of more powerful exhaust fans, which accelerates the gases, thereby eroding the refractories, which means more particles accumulating in the checker chambers.

Checker chambers, well known to a person skilled in the art, serve to recover heat from the flue gases. They consist of refractory bricks placed in separate compartments operating alternately. They are used in particular on end-fired or cross-fired furnaces. These furnaces are generally equipped with at least two burners operating in succession, and at least two checker chambers operating in succession to heat the oxidizer and to collect the flue gases. While the first burner operates and produces a flame in which the oxidizer is conveyed and heated by a first checker chamber located nearby, the flue gases are collected and conveyed to a second checker chamber which recovers the heat therefrom. The operation is reversed cyclically by shutting the first burner and by starting up the second burner, in which the oxidizer is conveyed and heated by the second checker chamber, which during the preceding step served to collect the flue gases. The first checker chamber accordingly serves as a fume collector. The furnace is therefore operated in one direction until a temperature of at least 1250° C. is obtained in the checker chamber recovering the flue gases, and the operation of the furnace is then reversed. Certain ceramics even make it possible to reach temperatures above 1450° C., and even about 1500° C.

It may be recalled that a unit melter operates on the principle of heat exchangers, the flue gases passing through a duct of the unit melter while the oxidizer flows through another duct of the unit melter. The flue gases transfer their heat to the oxidizer through the walls of these ducts. Thus, unlike the checker chamber, the unit melter does not operate on the principle of inversion.

In the case of a cross-fired furnace, the checker chambers are generally placed behind the side walls of the furnace. In the case of an end-fired furnace, they are generally placed behind the upstream wall of the furnace.

In glass furnaces, owing to the large diameter of the oxidizer inlet, it is generally difficult to separate the oxidizer and fuel inlets from one another by more than 4 times the oxidizer inlet diameter. Moreover, as already explained, low oxidizer entry speeds in the furnace atmosphere are desirable.

As a rule, in a glass furnace equipped with such large air inlets, the fuel injector is placed just below or inside (generally in the bottom) the oxidizer inlet itself.

According to the invention, it has now been discovered that extremely high NOx reductions, possibly exceeding 45% and even exceeding 60%, could be obtained in the case of oxidizer inlets with large cross sections, generally over $0.5 \, m^2$, with relatively low oxidizer inlet speeds. This novel configuration further serves to preserve a good heat transfer to the feed (glass batch and liquid glass).

The invention relates to a method of combustion in a furnace provided with a burner comprising an inlet for oxidizer comprising between 10% and 30% of oxygen and an inlet for fuel terminating in the furnace outside the oxidizer inlet and at a distance therefrom of between 0.3 and 4 times the equivalent diameter of the oxidizer inlet, said oxidizer entering the furnace at a speed of between 10 and 60 m/s.

The invention provides a very significant NOx reduction for any type of furnace using at least one burner with combustion of oxidizer and fuel. The invention is applicable in particular to any type of glass furnace, such as end-fired furnaces, cross-fired furnaces, with checker chambers or unit melters. Spectacular NOx reductions can be obtained in the case of end-fired furnaces.

The oxidizer inlet cross-sectional area in the furnace is generally at least $0.25 \, m^2$ and even higher than $0.5 \, m^2$ and even generally higher than $0.8 \, m^2$, and generally lower than 3 $m^2$ and more generally lower than 2 $m^2$.

In the context of the invention, the oxidizer is generally heated before entering the furnace atmosphere, to a temperature of at least 400° C., or even at least 1000° C. The checker chambers generally heat the air between 1100 and 1400° C. The unit melters generally heat the air to between 300° C. and 900° C. Preferably, the oxidizer is heated to at least the autoignition temperature of the fuel.

The oxidizer is air or low-oxygen-enriched air, so that the total oxygen content of the oxidizer is lower than 30% and even generally lower than 25%. This total oxygen content in the oxidizer is higher than 10%.

According to the invention, the oxidizer enters the furnace at a speed higher than 10 m/s and preferably higher than 15 m/s. According to the invention, the oxidizer enters the furnace at a speed lower than 60 m/s and preferably lower than 50 m/s, for example lower than 45 m/s.

The oxidizer and fuel inlets in the furnace terminate via different orifices in the furnace (hence the oxidizer inlet contains no fuel injector) and are separated by at least 0.3 times and preferably at least 0.5 times, for example at least 0.6 times the equivalent diameter of the oxidizer inlet. In the context of the present invention, equivalent diameter means the diameter of a circle having the same cross-sectional area as the air inlet. This definition is necessary because air inlets in glass furnaces are usually not circular. The oxidizer and fuel inlets in the furnace are separated by at least four times the equivalent diameter of the oxidizer inlet and preferably at least three times the equivalent diameter of the oxidizer inlet. In general, this distance is at least 20 cm and even at least 50 cm and may be as long as 4 m. These distances between fuel and oxidizer inlets are those between the two nearest points between the fuel inlet on the one hand and the oxidizer inlet on the other. The term burner designates the assembly comprising the oxidizer inlet and the associated fuel inlet or inlets for maintaining a combustion reaction. If a plurality of fuel injectors are associated with one oxidizer inlet, all the injectors are positioned so that the combustion reaction is substantially initiated at the same time for all said injectors.

Generally, the injector or injectors associated with an oxidizer inlet (that is participating in the same reaction zone) is(are) located in the same plane (same wall) as said oxidizer inlet. However, the oxidizer and fuel inlets do not necessarily terminate on the same wall.

In the case of a gaseous fuel (such as natural gas, methane, butane, propane), the fuel enters the furnace at a speed higher than 30 m/s and preferably higher than 50 m/s. According to the invention, the speed at which the fuel enters the furnace is lower than 250 m/s and preferably lower than 200 m/s.

The use of a liquid fuel, such as heavy fuel oil, is possible.

Figure 1:
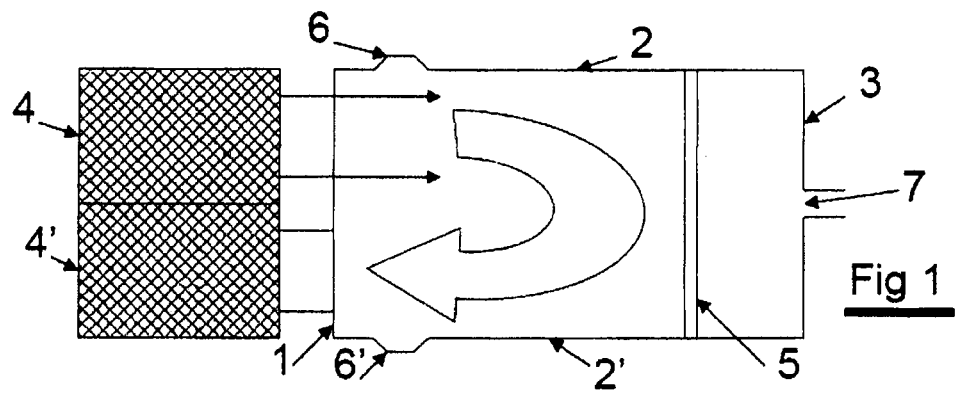
FIGS. 1 and 2 show an end-fired furnace in a plan view.

FIG. 1 shows an end-fired furnace suitable in the context of the present invention, in a plan view. This furnace comprises an upstream face 1, two lateral faces and 2' and one downstream face 3. It is equipped with two identical checker chambers 4 and 4', juxtaposed and both placed behind the upstream face. Each checker chamber is placed behind one half of the upstream face. Niches 6 and 6' are arranged in the side walls 2 and 2' for introducing the glass batch. These niches are placed in the upstream first third of the side walls. A dam 5 immersed in the glass melt is provided in the downstream half of the furnace. In the case of FIG. 1, the flame issues from one half 1a of the upstream face. It forms a loop in the furnace atmosphere to return to the other half 1b of the upstream face. The flue gases accordingly pass through the checker chamber 4' placed behind the half 1b of the upstream face. When the refractory bricks in the checker chamber 4' are sufficiently hot, the operation of the furnace is reversed according to FIG. 2. In this case, the flame issues from the half 1b of the upstream face and the heat of the flue gases is recovered in the other checker chamber 4. The oxidizer of the flame is air heated while passing through the checker chamber 4'. The glass flows through the orifice 7 arranged in the downstream face 3 of the furnace. The fuel injectors are not shown. They are distant from the air inlets, according to the invention.

Figure 3:
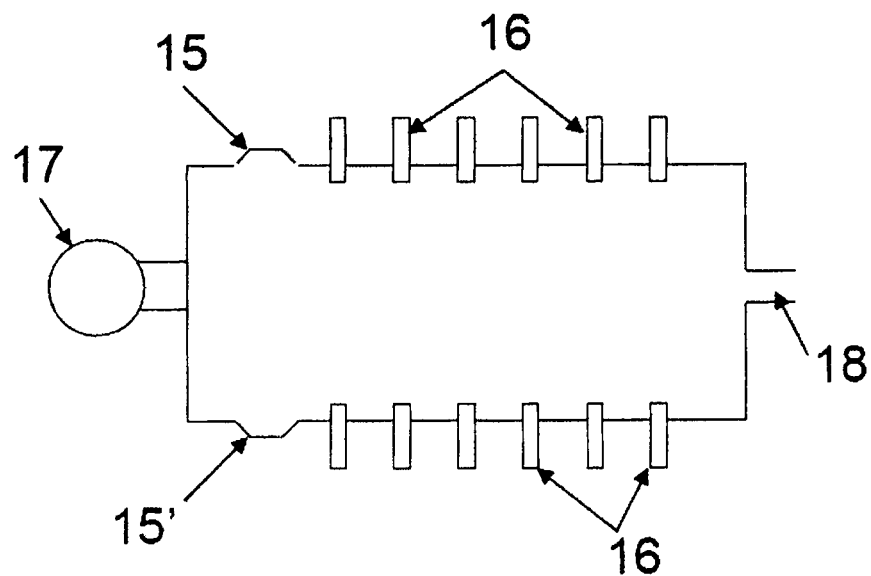
FIG. 3 shows a plan view of a cross-fired furnace equipped with a unit melter.

FIG. 3 shows a cross-fired furnace in a plan view. The glass batch is introduced via niches 15 and 15' located upstream in the side walls. Numerous transversal burners 16 are provided on the side walls. The heat of the flue gases is recovered by the unit melter 17. The glass is recovered via the outlet 18. It should be recalled that a unit melter operates on the model of a heat exchanger, the flue gases passing through a channel heating the air passing through another channel and feeding the transversal burners. The fuel injectors are not shown. They are distant from the air inlets, according to the invention.

Figure 4:
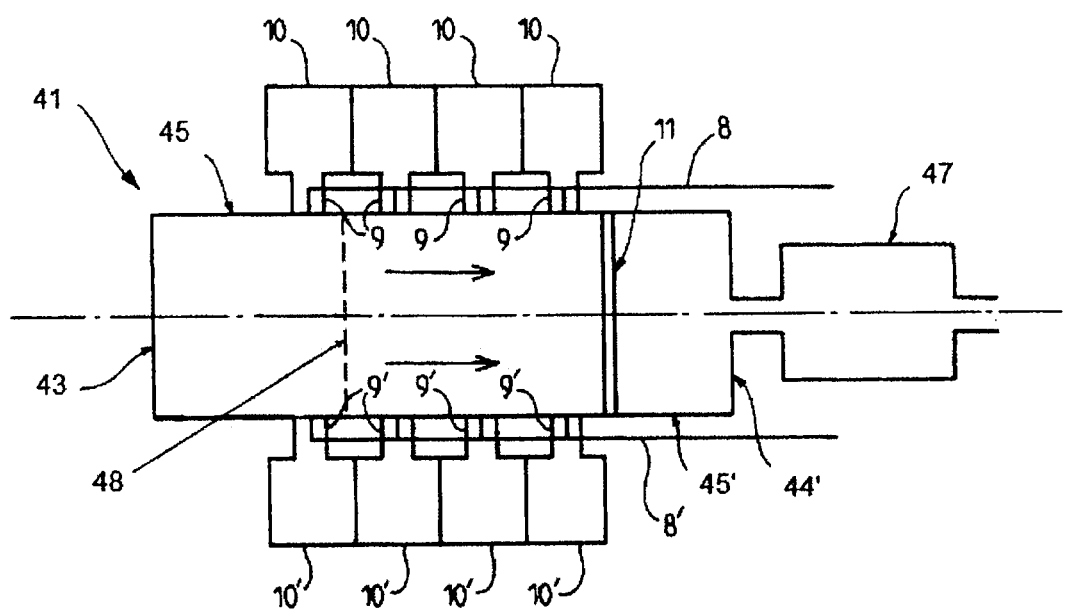
FIG. 4 shows a plan view of a cross-fired furnace equipped with checker chambers.

FIG. 4 shows a cross-fired furnace 41 with burners and checker chambers. The furnace 41 comprises an upstream wall 43, a downstream wall 44 and two side walls 45 and 45'. The glass batch is introduced from the upstream wall 43 via a conventional device not shown. The melted batch flows from upstream to downstream as shown by the arrows. The glass passes into a cooling-down chamber 47 for thermal conditioning before flowing into the processing unit not shown, which may be a float glass installation for the production of flat glass. The furnace 41 is equipped through its two side walls with two rows of four air gas burners operating in succession. Each air gas burner comprises a fuel injector fed with gas via the lines 8 and 8', and a hot air inlet 9 and 9'. It may be observed that the first two burners of each side wall are in the upstream first third of the furnace (the boundary of this first third is indicated by a transverse dotted line 48). The injector is located below the air inlet, at a sufficient distance according to the invention. The openings 9 and 9' alternately play the role of a hot air inlet and a fume collector. Each is connected to a checker chamber 10, 10'. When the injectors of the wall 45 operate, those of the wall 45' do not operate. The flue gases pass through the openings 9' of the side wall 45 opposite them and their heat is recovered in the checker chambers 10. After a few tens of minutes, the furnace operation is reversed, that is the operation of the burners of the wall 45 is stopped (fuel gas flow stopped through the line 8 and air flow stopped through the openings 9) and the air gas burners of the wall 45' are operated by supplying its injectors with gas via the line 8' and by supplying hot air to the air inlets 9'. The air is hot thanks to the heating by the checker chambers 10. After a few tens of minutes, the furnace operation is again reversed, and so on (repetition of the inversion cycle). The furnace is equipped with a weir 11 promoting the formation of convection belts in the glass melt.

Figure 2:
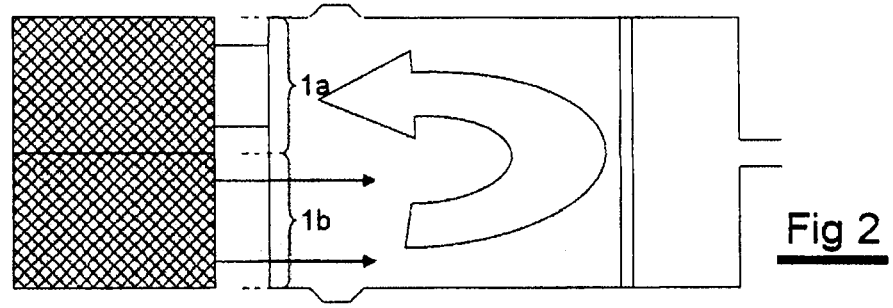
Figure 5:
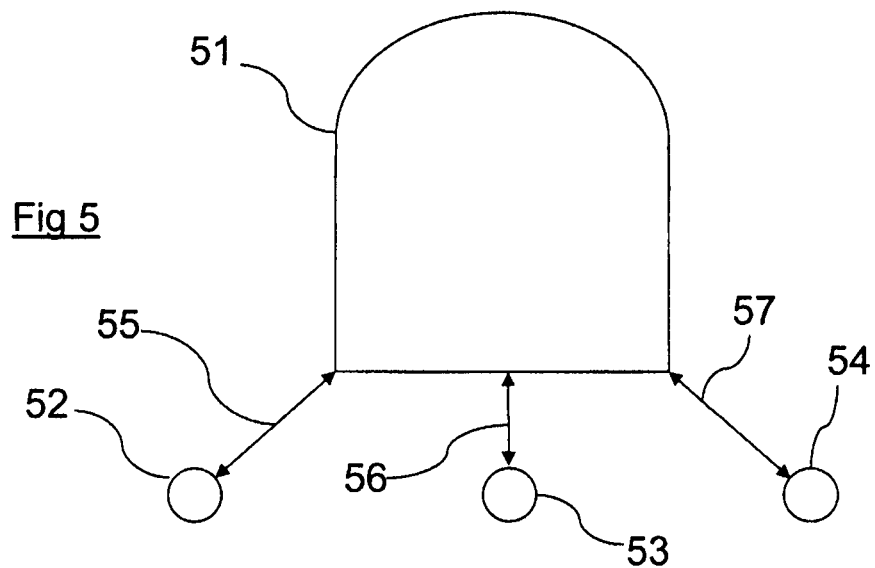
FIG. 5 shows an oxidizer and fuel inlet forming a burner according to the invention.

FIG. 5 shows the combination of an oxidizer inlet 51 and three fuel injectors 52, 53, 54 according to the invention, suitable in particular for use at the upstream face of an end-fired furnace (as for that of FIGS. 1 and 2). The injectors are outside the oxidizer inlet and the distance 55, 56, 57 between the injectors and the oxidizer inlet is between 0.2 and 0.5 times the equivalent diameter of the air inlet.

Figure 6:
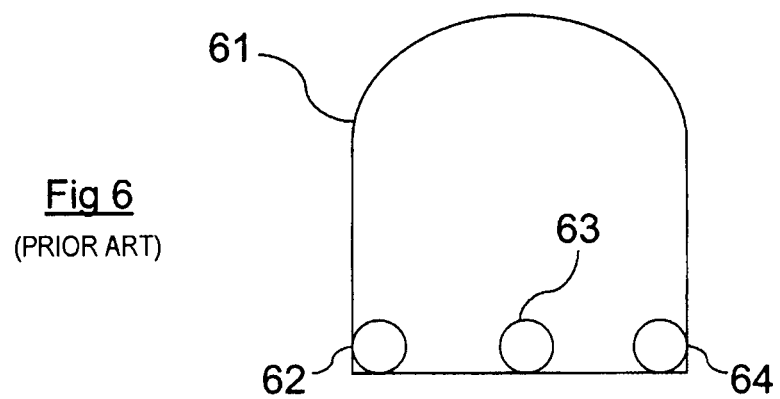
FIG. 6 shows an oxidizer and fuel inlet forming a burner according to the prior art.

FIG. 6 shows an air inlet 61 according to the prior art, associated with three injectors 62, 63, 64 located inside and at the bottom of the air inlet.

EXAMPLE 1

A cross-fired furnace was used, equipped with checker chambers, like the one shown in FIG. 3. The air inlet ducts, having a cross-sectional area of 0.25 m² are placed on each of the end walls (side walls) of the furnace, so that the main air flow is perpendicular to the glass flow. The air ducts are grouped in opposing pairs of ducts. Each air inlet duct is associated with two fuel injectors (natural gas), placed at a distance equal to the equivalent diameter of the associated air duct. The ducts of each of the pairs operate cyclically. During a cycle, the air arrives via one of the ducts and the fuel via the associated injectors. The flue gases produced by the combustion reaction preferably leave via the duct opposite them, and pass through a stack of refractory materials, to which they give up part of their energy. During the next cycle, the air inlet becomes the outlet and vice versa. The air passes through the stack of refractories previously heated by the flue gases, and is heated upon contact with them.

The air inlet temperature in the furnace is about 1300° C., or higher than the autoignition temperature of the fuel. The air injection speed in the furnace is about 40 m/s. The fuel injection speed is also about 40 m/s.

The nitrogen oxide emissions are lower than 400 mg/Sm³.

EXAMPLE 2

Comparative

The same procedure is followed as in example 1, except that the air injection speed is reduced to 12 m/s by increasing the air inlet cross-sectional area to 0.9 m², and the distance between the air inlet and the injector is reduced to 0.2 times the equivalent diameter of the air duct. The nitrogen oxide emissions measured are close to 800 mg/Sm³, indicating that the invention as described in example 1 has served to reduce the NOx emissions by a factor of 2 compared with the configuration in the present example. The heat transfer to the feed (liquid glass and batch) is identical to that observed in example 1.

EXAMPLE 3

An end-fired furnace equipped with checker chambers was used, like the one shown in FIG. 1. The checker chambers, two in number, are placed behind the upstream gable end of the furnace, which abuts the raw material inlets and is opposite the side through which the molten glass exits. On this wall are located the two ducts which operate alternately either as an inlet for air preheated by the checker chamber and as an outlet for the flue gases produced by combustion. Since the two ducts are located on the same wall, this creates a flame that follows the flow direction and has a characteristic loop shape. During the next cycle, the roles are reversed and the flame is reversed: the air inlet duct becomes the new flue gas outlet duct, enabling the periodic transfer of the heat from the flue gases to the stacks of refractory materials of the checker chamber, and thereby preheating the combustion air. The air inlet temperature of the furnace is about 1300° C., higher than the fuel autoignition temperature. The air inlet ducts are dimensioned to have air inlet speeds of 25 m/s in the furnace. Each air inlet duct is associated with 4 fuel injectors which are located at a distance 0.8 times the equivalent diameter of the air duct, for two of these injectors and, a distance of 1.6 times the equivalent diameter of the air duct, for the other two injectors. The burnt gases are entrained by the jet of air and fuel before combustion takes place, in order to produce a very dilute combustion. The NOx emissions amount to 200 mg/Sm³.

EXAMPLE 4

Comparative

The same procedure is followed as in example 3, except that the air inlet ducts are dimensioned to have air inlet speeds of about 15 m/s in the furnace and the distance between the air inlet and the injectors is decreased to 0.1 times the equivalent diameter of the oxidizer inlet, the injectors being located just under the air stream.

The NOx emissions measured amounted to 800 mg/Nm$^3$, indicating that the invention as described in example 3 served to reduce the NOx emissions by 75% compared to the configuration of the present example.

The heat transfer to the feed (liquid glass and batch) is identical to that observed in example 3.

The invention claimed is:

1. A method of combustion in a furnace comprising a burner comprising at least one inlet for an oxidizer comprising between 10% and 30% of oxygen and at least one inlet for fuel, wherein each inlet for fuel terminates in the furnace at a distance of between 0.3 and 4 times the equivalent diameter of an oxidizer inlet from an oxidizer inlet and wherein each inlet for an oxidizer is an inlet for an oxidizer comprising between 10 and 30% of oxygen, comprising introducing said oxidizer into the furnace at a speed of between 10 and 60m/s, wherein an oxidizer inlet cross-sectional area is at least equal to 0.25 m$^2$ and lower than 3 m$^2$.

2. The method according to claim 1, wherein the distance between the oxidizer inlet and the fuel inlet is shorter than 3 times the equivalent diameter of the oxidizer inlet.

3. The method according to claim 1, wherein the distance between the oxidizer inlet and the fuel inlet is at least 0.5 times the equivalent diameter of the oxidizer inlet.

4. The method according to claim 1, wherein the distance between the oxidizer inlet and the fuel inlet is between 20 cm and 4 m.

5. The method according to claim 1, wherein the oxidizer enters the furnace at a speed higher than 15 m/s.

6. The method according to claim 1, wherein the oxidizer enters the furnace at a speed lower than 50 m/s.

7. The method according to claim 1, wherein the oxidizer is heated to a temperature of at least 400° C. before entering the furnace.

8. The method according to claim 1, wherein the oxidizer is heated to a temperature of at least 1000° C. before entering the furnace.

9. The method according to claim 1, wherein the oxidizer is heated to at least the autoignition temperature of the fuel before entering the furnace.

10. The method according to claim 1, wherein the oxidizer inlet cross-sectional area is between 0.5 and 3 m$^2$.

11. The method according to claim 1, wherein the oxidizer inlet cross-sectional area is between 0.8 and 3 m$^2$.

12. The method according to claim 1, wherein the fuel is a gas and a speed of the fuel entering into the furnace is higher than 30 m/s.

13. The method according to claim 12, wherein the speed of entry of the fuel is higher than 50 m/s.

14. The method according to claim 12, wherein the fuel is a gas and the speed of the fuel entering into the furnace is lower than 250m/s.

15. The method according to claim 1, wherein the oxidizer comprises between 10% and 25% of oxygen.

16. A method of melting a glass batch in a furnace wherein the glass melt flows from upstream to downstream in the furnace, and the furnace has a powder batch feed located in the upstream half of the furnace, and a burner located in the upstream half of the furnace, wherein the furnace comprises a burner comprising at least one inlet for an oxidizer comprising between 10% and 30% of oxygen and at least one inlet for fuel, wherein each inlet for fuel terminates in the furnace at a distance of between 0.3 and 4 times the equivalent diameter of an oxidizer inlet from an oxidizer inlet and wherein each inlet for an oxidizer is an inlet for an oxidizer comprising between 10% and 30% of oxygen, comprising introducing said oxidizer into the furnace at a speed of between 10 and 60 m/s, wherein an oxidizer inlet cross-sectional area is at least equal to 0.25 m$^2$ and lower than 3 m$^2$.

17. The method according to claim 16, wherein powder batch materials are supernatant in the upstream first third of the furnace and the burner is located in the upstream first third of the furnace.

18. The method according to claim 16, wherein the furnace is an end-fired furnace.

19. The method according to claim 16, wherein the furnace is a cross-fired furnace.

* * * * *